United States Patent
Raviv et al.

(10) Patent No.: US 6,373,464 B1
(45) Date of Patent: Apr. 16, 2002

(54) MAGNIFYING GLASS COMPUTER INPUT DEVICE

(75) Inventors: Roni Raviv, Nes-Ziona (IL); Warren E. Bosch, Colorado Springs, CO (US); Scott E. Balaban, Boston; Frank D. Ventura, Newburyport, both of MA (US); Omri Rothschild, Tel Aviv (IL)

(73) Assignees: R&R Design and Development Ltd., Tel Aviv (IL); Hasbro Interactive, Inc., Beverly, MA (US)

( * ) Notice: Subject to any disclaimer, the term of this patent is extended or adjusted under 35 U.S.C. 154(b) by 0 days.

(21) Appl. No.: 09/497,501

(22) Filed: Feb. 4, 2000

(51) Int. Cl.[7] .................................................. G09G 5/00
(52) U.S. Cl. ....................... 345/156; 345/159; 345/166; 345/180; 345/207; 359/827; 362/31; 362/109
(58) Field of Search ................................ 345/156, 159, 345/166, 180, 207; 359/827; 362/31, 109

(56) References Cited

U.S. PATENT DOCUMENTS

| | | | |
|---|---|---|---|
| 3,599,221 A | 8/1971 | Baer ............................. 346/1 |
| 4,472,710 A | 9/1984 | Suzuki et al. ............... 340/707 |
| 4,540,176 A | 9/1985 | Baer ............................ 273/148 |
| 4,602,907 A | 7/1986 | Foster ......................... 434/337 |
| 4,608,601 A | 8/1986 | Shreck et al. ............... 358/146 |
| 4,949,978 A | 8/1990 | Berner ........................ 273/288 |
| 5,021,933 A | * 6/1991 | Cordes ........................ 362/109 |
| 5,031,918 A | 7/1991 | Brill ............................ 273/288 |
| 5,132,849 A | * 7/1992 | Cordes ........................ 359/798 |
| 5,325,278 A | 6/1994 | Tortola et al. .............. 362/109 |
| 5,850,304 A | * 12/1998 | Elmers et al. .............. 359/142 |
| 6,061,052 A | 5/2000 | Raviv et al. ................ 345/180 |
| 6,085,112 A | * 7/2000 | Kleinschmidt et al. ..... 455/556 |
| 6,097,376 A | 8/2000 | Rothschild et al. ......... 345/180 |

* cited by examiner

Primary Examiner—Richard Hjerpe
Assistant Examiner—Ali Zamani
(74) Attorney, Agent, or Firm—Fish & Richardson P.C.

(57) ABSTRACT

A computer input device includes a housing in the shape of a magnifying glass having a lens portion and a handle portion extending from the lens portion. The device also includes a detector mounted in the housing and operable to detect an element displayed on a computer display and to generate a corresponding detection signal and an actuator mounted on the housing. Circuitry mounted in the housing is operable to receive the detection signal, generate an actuation signal in response to actuation of the actuator, and transmit the detection signal and the actuation signal to a computer. The housing may include a partially reflective, angularly disposed beam splitter such that a user can observe an image on a computer screen through the beam splitter, and the image can be reflected to the detector. The computer may have software operable to control an image displayed on the computer monitor in response to the detection signal.

14 Claims, 4 Drawing Sheets

MAGNIFYING GLASS COMPUTER INPUT DEVICE

TECHNICAL FIELD

This invention relates to computer input devices.

BACKGROUND

Computer input devices include general purpose devices, such as a keyboard, a mouse, and a game controller. Computer input devices also include special purpose devices designed for use with particular types of applications (e.g., games). These devices include, for example, steering wheel devices, gun devices, and joysticks.

SUMMARY

In one general aspect, the invention provides a computer input device that includes a housing in the shape of a magnifying glass having a lens portion and a handle portion extending from the lens portion. The device also includes a detector mounted in the housing and operable to detect an element displayed on a computer display and to generate a corresponding detection signal. An actuator is mounted on the housing. Circuitry mounted in the housing is operable to receive the detection signal, to generate an actuation signal in response to actuation of the actuator, and to transmit the detection signal and the actuation signal to a computer.

Embodiments may include one or more of the following features. For example, the actuator may be a button, and the circuitry may be an integrated circuit.

The housing may include a beam splitter positioned in the center of the lens portion. The beam splitter may be partially reflective, and it may also be angularly disposed with respect to the plane that bisects the lens portion and includes the longitudinal axis of the handle portion.

The detector may be positioned so that a user can observe an image on a computer screen through the beam splitter, and the image can be reflected by the beam splitter through an optical lens to the detector. The detector may be a photodetector.

The circuitry may include a processor that is connected to detect actuation of the actuator and to generate the actuation signal in response. The processor may also be connected to receive the detection signal. The device may also include a cable connected to the circuitry to carry the detection signal and the actuation signal to the computer.

In another general aspect, a computer system includes a processor, a display, and a computer input device. The device includes a housing in the shape of a magnifying glass having a lens portion and a handle portion extending from the lens portion. The device also includes a detector mounted in the housing and operable to detect an element displayed on the display and to generate a corresponding detection signal. An actuator is mounted on the housing. Circuitry mounted in the housing receives the detection signal, generates an actuation signal in response to actuation of the actuator, and transmits the detection signal and the actuation signal to the processor.

The system may include software including instructions for causing the processor to control the display to display different elements at different locations in response to the actuation signal, to monitor the detection signal, and to control an image displayed on the display based on a region of the display upon which the detection signal indicates that the computer input device is focused.

Other features and advantages will be apparent from the following description, including the drawings, and from the claims.

DESCRIPTION OF DRAWINGS

Like reference symbols in the various drawings indicate like elements.

DESCRIPTION

Figure 1:
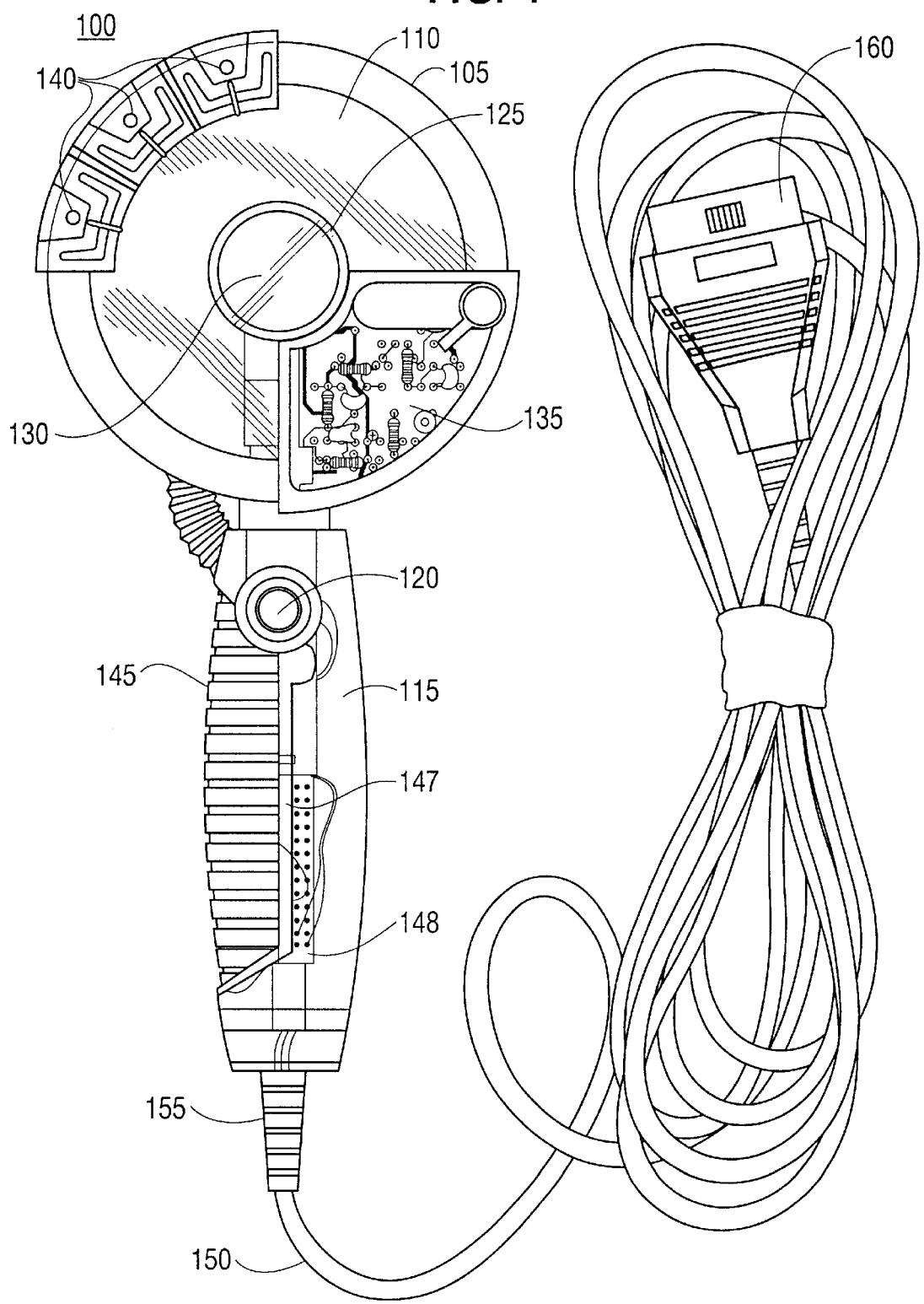
FIG. 1 is a front view of a computer input device.

Referring to FIG. 1, a computer input device 100 includes a housing 105 in the shape of a magnifying glass. The housing 105 includes a lens portion 110 and a grip portion 115. A user-operable button 120 extends from the grip portion 115, and is positioned near the connection between the lens portion 110 and the grip portion 115 so as to permit easy manipulation by the player's thumb. The device 100 provides input for a game in which a player inspects objects displayed on a computer display using the magnifying glass. To this end, the device 100 provides information identifying a portion of the display at which the device is directed when the player presses the button 120. Additional details about interaction between software and a device used to select a portion of a display are provided in U.S. application Ser. No. 08/990,623, titled "Display Pointing Device" and filed Dec. 15, 1997, which is incorporated by reference.

The lens portion 110 includes a center sensor area 125 that is partially surrounded by a transparent plastic area 130. One quadrant of the area surrounding the center sensor area 125 includes a decorative illustration 135 of a circuit board. Three light-emitting diodes (LEDs) 140 are positioned along the perimeter of the lens portion 110. The LEDs 140 light up when the button 120 is pressed.

The grip portion 115 includes a ribbed section 145 that extends along one side of the length of the grip portion 115. The remainder of the grip portion 115 is formed from translucent plastic that permits the player to view internal components of the device 100. In other implementations, the grip may be formed from transparent or opaque materials. A circuit board 147 having mounted upon it an integrated circuit 148 is positioned within the grip portion 115.

A cable 150 extends from the bottom 155 of the grip portion 115. The cable 150 includes a connector 160 at an end opposite the device 100. The connector 160 is used to connect the device to a computer or a game console.

Figure 2:
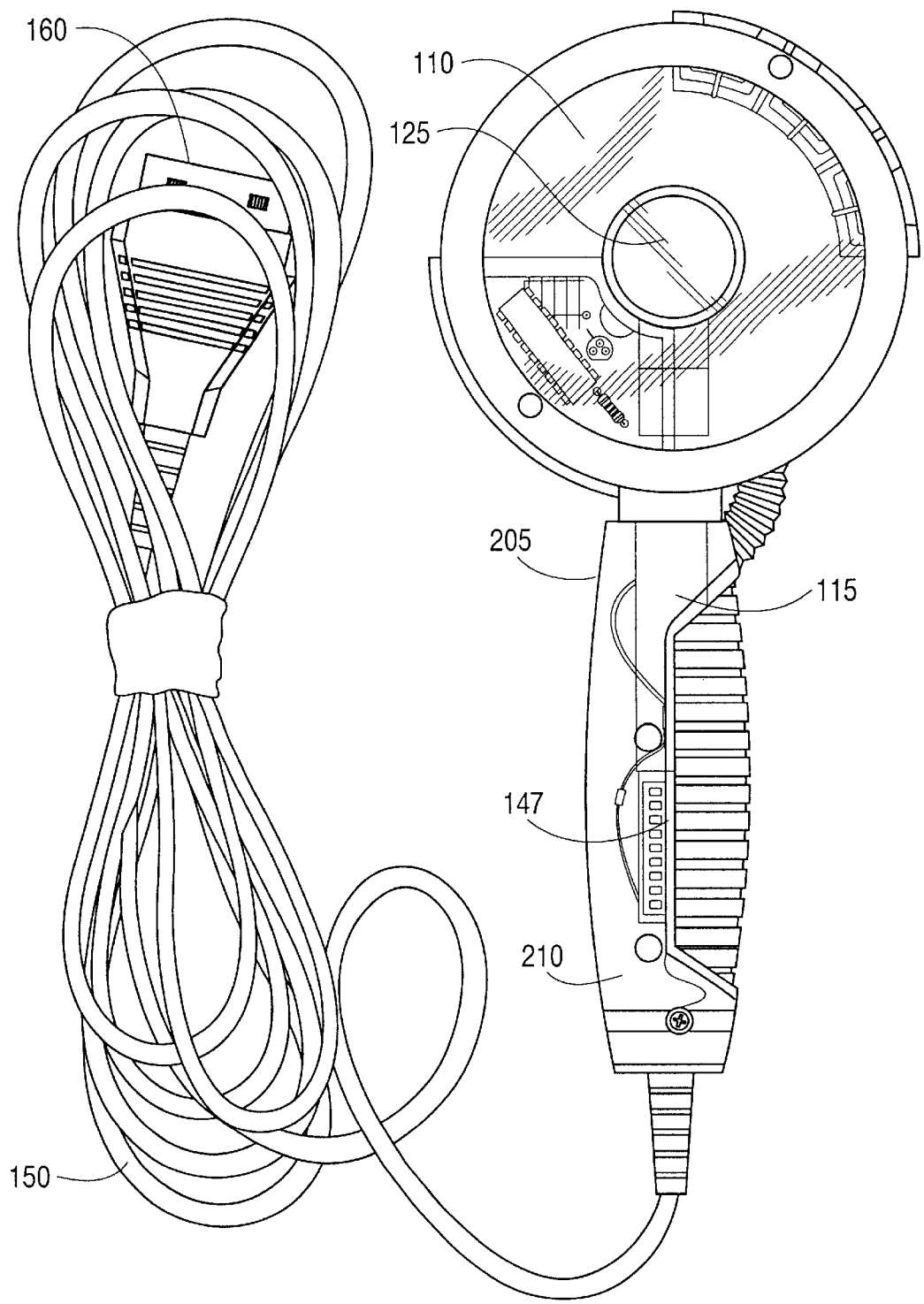
FIG. 2 is a back view of the device of FIG. 1.

Referring also to FIG. 2, the grip portion 115 contains a photodetector 205 and wiring 210 mounted on the back of the circuit board 147. Signals from the photodetector 205 are processed and transmitted to the connector 160 through the cable 150.

Figure 3:
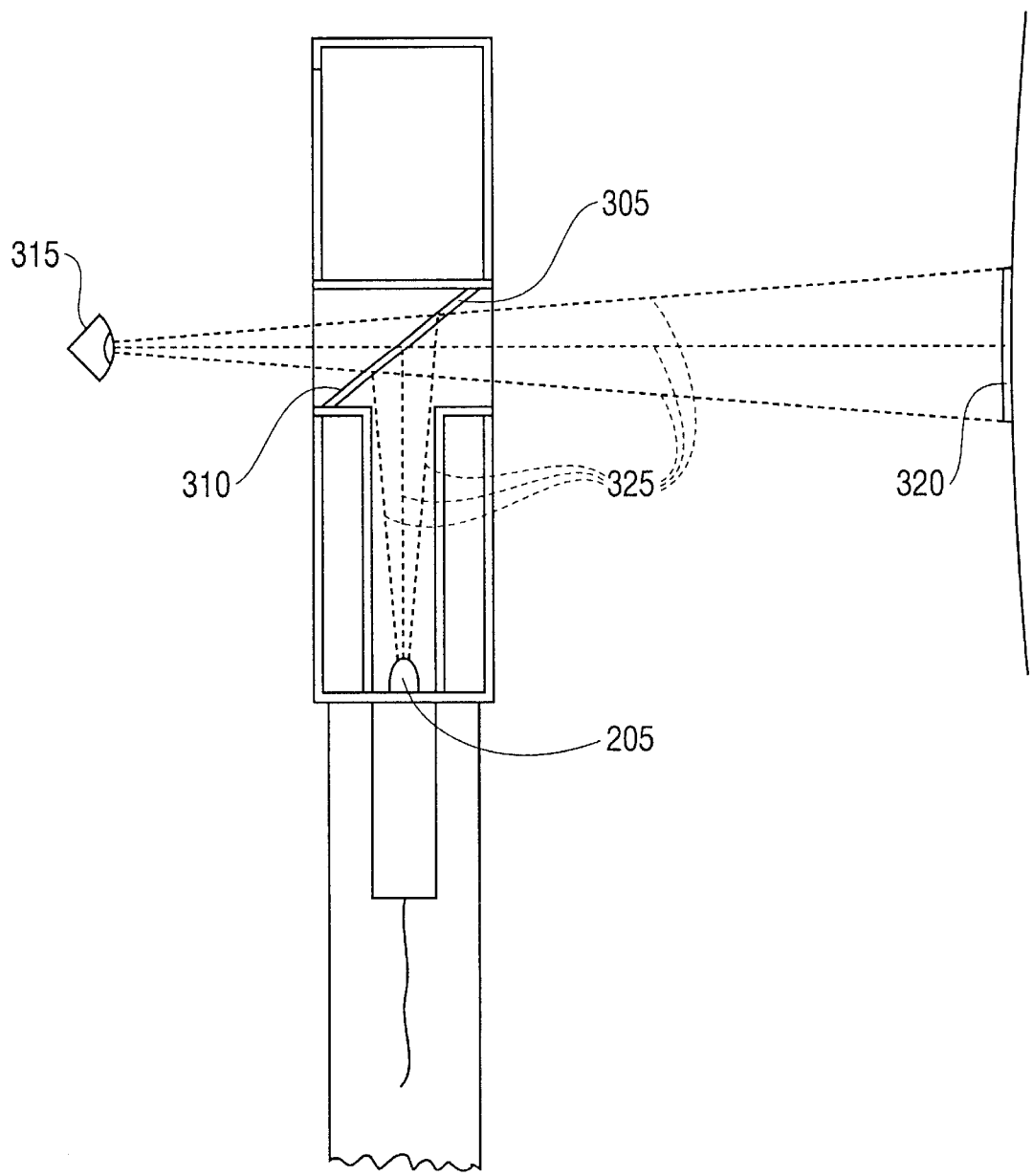
FIG. 3 is an illustration of components of the device of FIG. 1.

Referring also to FIG. 3, the center sensor area 125 includes an inclined plastic panel 305. The panel 305 includes a partially reflective coating on its front face 310. The coating directs a portion of the light striking the front face down through an optical lens 312 to the photodetector 205 while permitting the rest of the light to pass through the panel. For example, in one implementation, the coating reflects approximately 30% of the light. The reflected light is concentrated onto the photodetector 205 by the optical lens 312.

A player's eye 315 focuses on a target area 320 on a computer display by looking through the center sensor area 125 of the device 100. When the device 100 is aimed at a target area 320, the player presses the button 120. This causes the display to display different light patterns at different target areas. The light pattern emitted from the target area 320 forms an image that is reflected by the panel 305 through the lens 312 toward the photodetector 205 as indicated by several line segments 325 that illustrate exemplary paths of light rays. The photodetector 205 detects the light and produces a signal that is processed by the integrated circuit 148 and other components of the circuit board 147 before being transmitted to the connector 160 through the cable 150.

Figure 4:
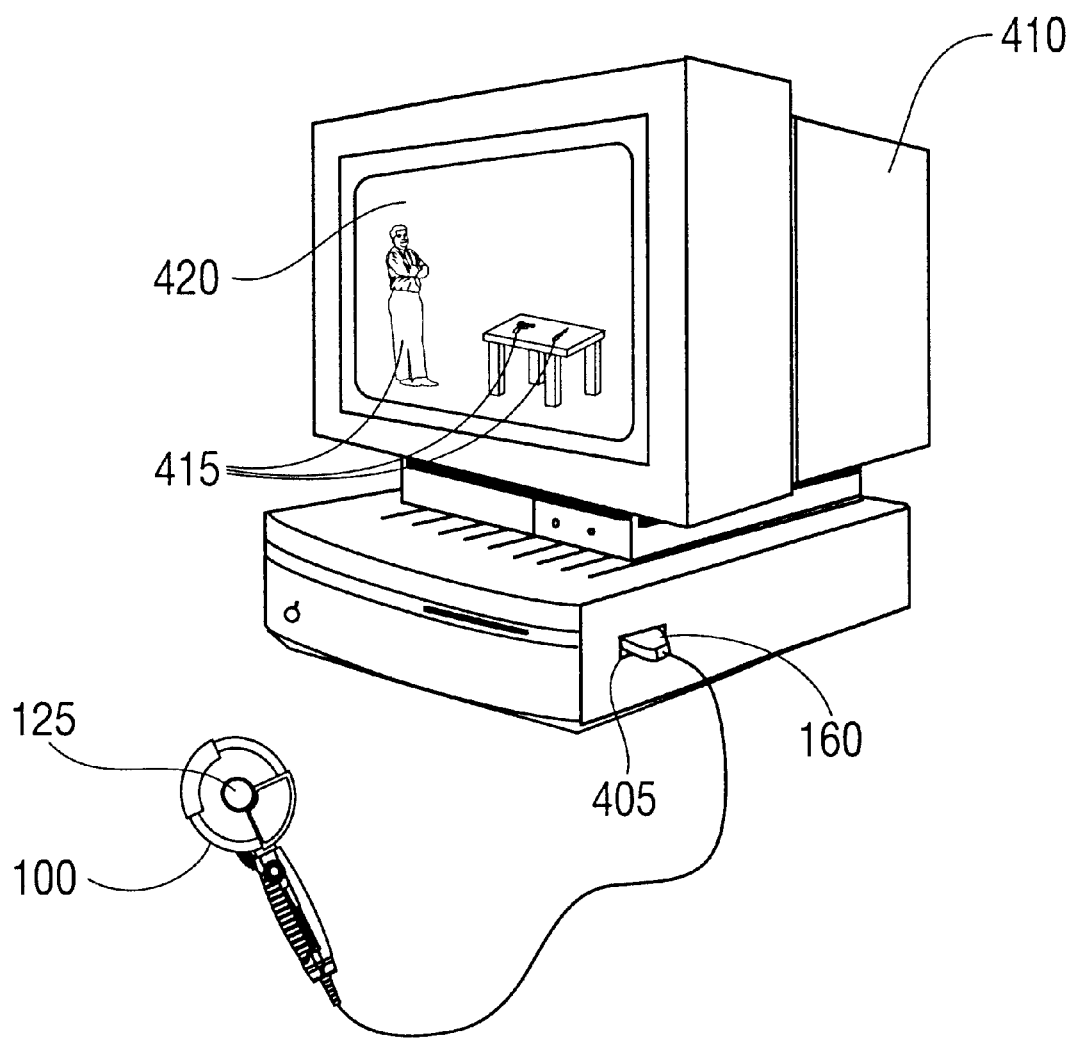
FIG. 4 is an illustration of a computer system including the input device of FIG. 1.

Referring also to FIG. 4, the connector 160 is connected to a port 405 of a computer 410. In one implementation, game software running on the computer 410 presents a game in which a user uses the magnifying glass device 100 to inspect objects 415 presented on a display 420 of the computer 410. To inspect an object 415, the user focuses the center sensor area 125 of the device 100 on the object 415 and presses the button 120. The device 100 generates a signal in response to the actuation of the button 120, and transmits the signal to the computer 410 through the cable 150, the connector 160, and the port 405.

The software responds to the signal by generating different patterns at different target regions of the display 420. One of these patterns is detected by the photodetector and transmitted to the computer 410. The software takes appropriate action in response to the detected pattern. For example, if the pattern indicates that the center sensor area 125 was focused on a depiction of a person, the software may cause the depiction of the person to speak.

Other embodiments are within the scope of the following claims.

What is claimed is:

1. A computer input device, comprising:
    a housing in the shape of a magnifying glass having a lens portion and a handle portion extending from the lens portion;
    a detector mounted in the housing and operable to detect an element displayed on a computer display and to generate a corresponding detection signal;
    an actuator mounted on the housing; and
    circuitry mounted in the housing and operable to:
        receive the detection signal;
        generate an actuation signal in response to actuation of the actuator; and
        transmit the detection signal and the actuation signal to a computer.

2. The computer input device of claim 1, wherein the actuator comprises a button.

3. The computer input device of claim 1, wherein the circuitry comprises an integrated circuit operable to generate the actuation signal.

4. The computer input device of claim 1, further comprising a beam splitter, wherein the beam splitter is positioned centrally within the lens portion of the housing and along a longitudinal axis of the handle portion.

5. The computer input device of claim 4, wherein the beam splitter is partially reflective.

6. The computer input device of claim 4, wherein the beam splitter is angularly disposed with respect to a plane that bisects the lens portion and includes the longitudinal axis.

7. The computer input device of claim 6, wherein the detector is positioned in the handle portion and along the longitudinal axis of the handle portion so as to detect a portion of the computer display visible through the lens portion.

8. The computer input device of claim 7, wherein the detector comprises a photodetector.

9. The computer input device of claim 1, wherein the detector comprises a photodetector.

10. The computer input device of claim 1, wherein the circuitry comprises a processor connected to detect actuation of the actuator and operable to generate the actuation signal in response to the actuation.

11. The computer input device of claim 10, wherein the processor is further connected to receive the detection signal.

12. The computer input device of claim 1, further comprising a cable connected to the circuitry for carrying the detection signal and actuation signal to the computer.

13. A computer system, comprising:
    a processor;
    a display; and
    a computer input device, the device including:
        a housing in the shape of a magnifying glass having a lens portion and a handle portion extending from the lens portion;
        a detector mounted in the housing and operable to detect an element displayed on the display and to generate a corresponding detection signal;
        an actuator mounted on the housing; and
        circuitry mounted in the housing and operable to:
            receive the detection signal,
            generate an actuation signal in response to actuation of the actuator, and
            transmit the detection signal and the actuation signal to the processor.

14. The computer system of claim 13, further comprising software running on the processor and including instructions for causing the processor to:
    control the display to display different elements at different locations in response to the actuation signal;
    monitor the detection signal; and
    control an image displayed on the display based on a region of the display upon which the detection signal indicates that the computer input device is focused.

* * * * *